United States Patent
Shi et al.

(10) Patent No.: US 7,126,987 B2
(45) Date of Patent: *Oct. 24, 2006

(54) METHOD AND SYSTEM FOR A FAST SERIAL TRANSMIT EQUALIZATION SCHEME

(75) Inventors: Hui Shi, San Jose, CA (US); Robert X. Jin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/220,225

(22) Filed: Sep. 6, 2005

(65) Prior Publication Data

US 2006/0007996 A1    Jan. 12, 2006

Related U.S. Application Data

(63) Continuation of application No. 10/074,193, filed on Feb. 12, 2002, now Pat. No. 6,975,675.

(51) Int. Cl.
*H03M 7/30*    (2006.01)

(52) U.S. Cl. ...................... 375/229; 375/296

(58) Field of Classification Search ............ None
See application file for complete search history.

(56) References Cited

U.S. PATENT DOCUMENTS

| 6,570,406 B1 | 5/2003 | Tang et al. ............. 326/86 |
| 2001/0035994 A1* | 11/2001 | Agazzi et al. ............. 359/152 |

OTHER PUBLICATIONS

Texas Instrucments, "TLK3104SA QUAD 3.125 Gbps Serial Transceiver," Aug. 2000, pp. 1-40.

* cited by examiner

*Primary Examiner*—Kevin Kim
(74) *Attorney, Agent, or Firm*—Pillsbury Winthrop Shaw Pittman LLP

(57) ABSTRACT

A transmitting device to send an input signal in a channel includes an equalization system. The equalization system includes a decision subsystem to determine when adjustments need to be made based on the frequency of 0s or 1s in the input signal. The equalization system also includes an equalization subsystem to determine, by default, or by user choice, a compensation for a channel's amplitude variation due to frequency response, and to apply the compensation to the input signal and generate an equalized output signal.

19 Claims, 9 Drawing Sheets

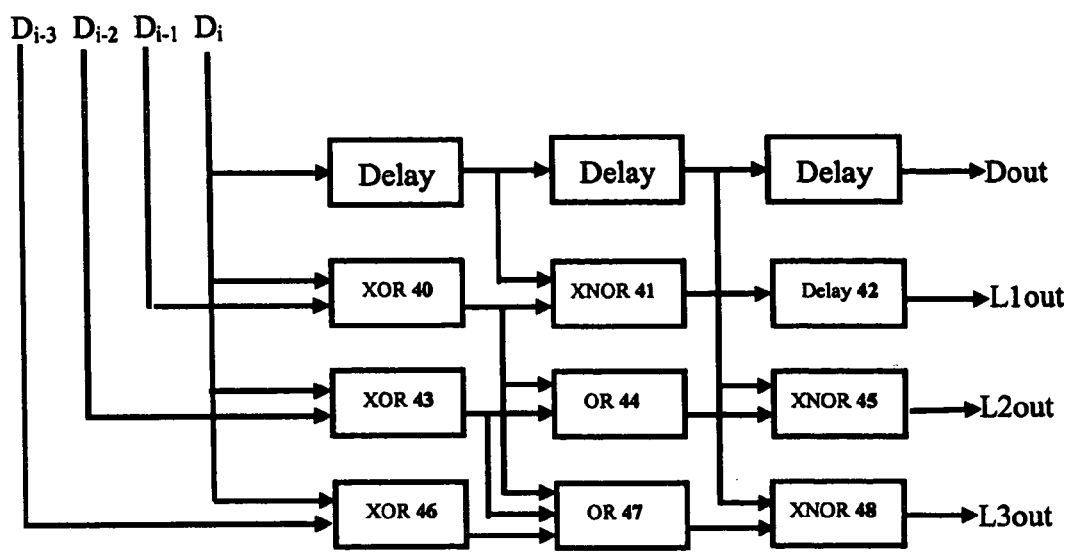
Fig. 6 A block diagram for the equalization logic that generates the three signals levels Sample Input Stream = 01000111100 (a = MSB; b = first to right of MSB; k = LSB)
a = 0; b = 1; c = 0; d = 0; e = 0; f = 1; g = 1; h = 1; I = 1; j = 0; k = 0

| Bit Identity | Dout | L1out | L2out | L3out |
|---|---|---|---|---|
| a | 0 | -------- | ---------- | ---------- |
| b | 1 | 1 | 1 | 1 |
| c | 0 | 0 | 0 | 0 |
| d | 0 | 1 | 0 | 0 |
| e | 0 | 1 | 1 | 0 |
| f | 1 | 1 | 1 | 1 |
| g | 1 | 0 | 1 | 1 |
| h | 1 | 0 | 0 | 1 |
| I | 1 | 0 | 0 | 0 |
| j | 0 | 0 | 0 | 0 |
| k | 0 | 1 | 0 | 0 |

METHOD AND SYSTEM FOR A FAST SERIAL TRANSMIT EQUALIZATION SCHEME

RELATED APPLICATIONS

This application is a continuation application of U.S. patent application Ser. No. 10/074,193, filed Feb. 12, 2002, now U.S. Pat. No. 6,975,675.

BACKGROUND OF THE INVENTION

1. Field of the Invention

The present invention generally relates to high-speed data transmission. More specifically, the present invention relates to a simple transmit equalization system that pre-distorts a data signal in order to compensate for frequency dependent amplitude variations in channel media.

2. Discussion of the Related Art

In recent years, the speed of digital data signals on printed circuit boards (PCBs) and in system backplanes between components is increasing as integrated circuit (IC) technology becomes faster and faster.

The most common method of transferring data between chips is via a parallel bus. A parallel bus includes, for example, a group of data lines and a clock, in which the clock is transmitted along with the data in order to latch in the data at the far end of the channel, or at the next chip. As clock rates reach 300 MHz and above, it becomes increasingly more difficult to implement a parallel bus due to skew between the clock and data lines, as well as transmission line effects.

Instead of using parallel buses at clock rates above 300 MHz, serial buses are utilized. In a serial bus, the parallel data is encoded, and sent without a clock. The purpose of encoding is to embed repetitive pattern transitions along with the data so that a far end device receiving the serial data can extract the clock from the data stream. The extracted clock signal is used to recover the data.

The skew between multiple serial bus lines is handled by placing digital alignment patterns inside the data so the far end device, such as an application-specific integrated circuit (ASIC), can realign the data streams with digital logic. Because the serial bus eliminates the clock line and embeds the clock information within the data stream, a serial bus is able to successfully function over longer distances than a parallel bus, if all other factors are equal.

Serial buses are extended further if equalization is used to cancel out the degrading effects of the PCB metal traces on the serial bus signal. It is known in the art to use "receive equalization" to correct signals for the effects of the PCB metal traces. "Receive equalization" is the modification of the serial signal at the receiver to compensate for the degrading effects of the PCB metal traces on the serial signal. However, at very high speeds (>1 GHz), receive equalization is difficult to implement and consumes a large area on the receiver side, as well as a large amount of power on the receiver side.

An additional approach for equalization is to pre-distort the transmit signal to compensate for the known degradation caused by the PCB traces. This technique is referred to as transmit equalization.

High speed communication over a serial bus is becoming commonplace in the industry, such as the serial bus interface 10 Gigabit Attachment Unit Interface, also known as "XAUI." XAUI is being defined for 10 Gigabit Ethernet by the Institute of Electrical and Electronic Engineers (IEEE) 802.3ae standards body. XAUI is a 10 Gigabit serial bus using four lanes of 2.5 Gigabit data that are 8 bit/10 bit encoded into a 3.125 Gigabaud lane. XAUI is intended to be the interface that connects 10 Gigabit physical layer devices with 10 Gigabit Ethernet controller devices.

The IEEE standard requires that XAUI work over 50 cm of FR4 PCB material. Tests reveal that inter-symbol interference (ISI) is a problem after 50 cm of FR4 if no transmit equalization occurs. A superposition of possible signal traces for two symbol periods out of a long random sequence of data is referred to as an eye diagram. If ISI becomes a problem, the openings of the eye diagram become smaller. Transmit equalization increases the eye pattern opening significantly after 50 cm of PCB trace and it can extend the distance over which XAUI operates beyond 50 cm.

Most of the prior art for transmit equalization is very complex and requires a large area on silicon. One transmit equalizer performs one-bit equalization on any runlength of 0s or 1s that is greater than one. For example, a one-bit equalization scheme adjusts the input signal with the same amplitude adjustment if it encounters at least two consecutive 0s or 1s. While this equalization does compensate for a portion of the frequency response of the channel, it is not precise and does not adequately compensate for longer runs of zeros and ones.

Accordingly, there is a need for a fast transmit equalization method and system which performs at least two-bit equalization and may be implemented with simple circuitry.

BRIEF DESCRIPTION OF THE DRAWINGS

FIG. 6 illustrates an efficient circuit implementation of a decision subsystem according to an embodiment of the present invention;

FIG. 7 illustrates a logic table for an input string that has been transmitted through the decision subsystem of FIG. 6 according to an embodiment of the present invention;

DETAILED DESCRIPTION OF THE INVENTION

When the serial data rate approaches a channel's rate limit, inter-symbol interference increases the bit error rate. The maximum frequency of serial digital data occurs when 1s and 0s alternate in a data stream, e.g., "101010101." The frequency is at one-half the maximum frequency rate when two 1s are followed by two zeros, e.g., "1100" and vice versa. In general, the frequency rate for a string of n 1s or 0s is 1/n of the maximum frequency rate, with n being the number of consecutive 1s or 0s in that string. For example, the data stream "11110000" would result in a frequency ¼ of the maximum frequency.

Figure 1:
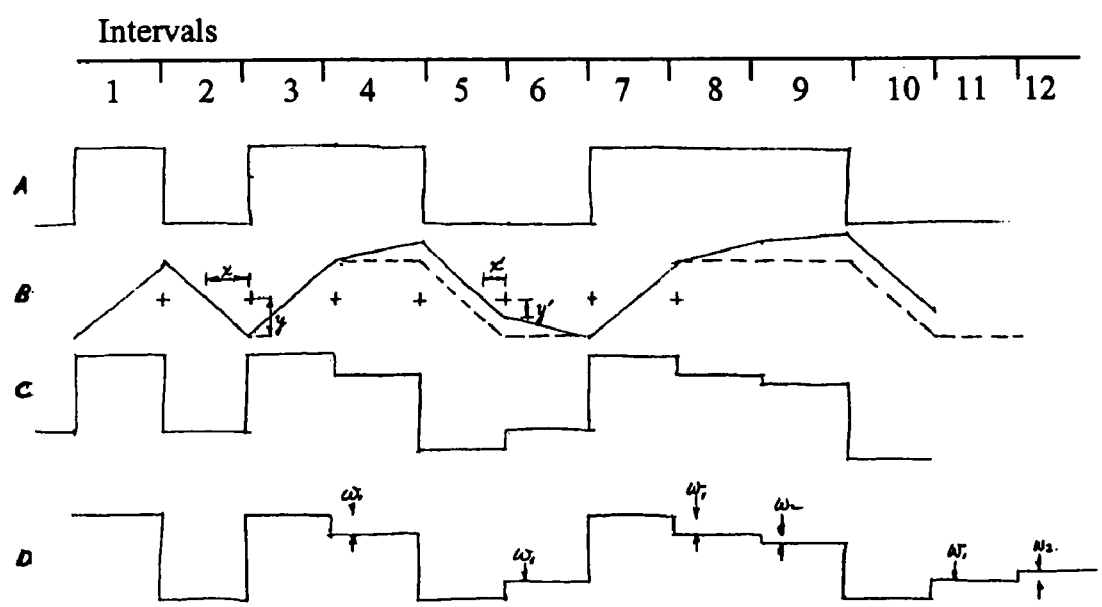
FIG. 1 illustrates an inter-symbol interference problem that occurs when a serial data rate approaches its channels rate limit and a compensated waveform to handle inter-symbol interference according to an embodiment of the present invention.

FIG. 1 illustrates an inter-symbol interference problem that occurs when an input data rate approaches its channel's rate limit and a compensated waveform to handle the inter-symbol interference problem. For time intervals 1 and 2, the data stream A alternates at the maximum frequency and this results in the channel response B in intervals 1 and 2. The ideal sample points for each interval are illustrated by a "+" on the channel response line B. For interval 2, the timing margin at the sample point is illustrated by "x" and the amplitude margin is illustrated by "y." The timing margin is the most error that does not cause a data error on the timing axis, and the amplitude margin is the most error that does not cause a data error on the amplitude axis.

The channel response B to a data stream at half the maximum frequency, e.g., 1100, has a higher amplitude than the channel response at maximum frequency, as illustrated in interval 4 of FIG. 1. The higher amplitude of the channel response B reduces the timing margin "x" to "x'" and reduces amplitude margin "y" to "y'" at the sample point between intervals 5 and 6. For each lower frequency, e.g., ⅓, ¼ (111000, 11110000, respectively), the channel response B 12 has a higher amplitude than at the previous sample point with a higher frequency.

An equalization system corrects this problem by reducing the amplitude of the input waveform to compensate for the increased amplitude at the lower frequencies. For example, in FIG. 1, the amplitude of C, the compensated waveform, is reduced in interval 4 to compensate for the projected higher amplitude of the channel response B. Ideally, the dashed line of channel response B would result and the timing and amplitude margins are restored to the original values of x and y. This ideal is compromised if the target process is too slow to implement this function for the desired bit rate.

The equalization system approximates the ideal behavior with a simple enough circuit to achieve high bit rates per unit process speed. The equalization system applies at least a two-bit equalization compensation to the input signal. For example, a two-bit equalization means that a string of 000 or 111 results in a predetermined adjustment to the input signal at the interval of the second 0 or 1, and another predetermined adjustment to the input signal at the interval of the third consecutive 0 or 1. A string of 000 results in an addition to the input signal of the predetermined adjustment at both the interval of the second zero and the third zero. For any other string of 0s or 1s with a length greater than three (e.g., 0000, 11111, 00000000) the same 2nd adjustment is applied to each interval beyond the second interval when the runlength is greater than three. For example, for a string of "0000," the first adjustment at the interval corresponding to the second 0 is $w_1$. The adjustment for the intervals corresponding to the third and fourth zeros is additional, $w_2$, and the amplitude of the adjustment is the same for the intervals which include the third and fourth zeros. The size or amplitude of the predetermined adjustment may depend on the channel material being utilized and the length of the desired transmission.

According to an embodiment of the present invention with two-bit equalization illustrated in FIG. 1, D is the compensated signal that the present invention may apply in response to the input data stream A. For example, in intervals 4, 6, and 8, the output may be reduced by a predetermined weight $w_1$, a function of the preceding string having a length of two 0s or 1s and the channel frequency response. The other example is in interval 9, where the output might be reduced by an additional pre-determined weight $w_2$, a function of the preceding string having a length of three 0s or 1s and the channel frequency response. The response to a random string of 1s or 0s is the same as the response shown in D to an input string of 1s and 0s in A, meaning a reduction of $w_1$ would always be applied to two 0s or 1s in this embodiment and a reduction of $w_2$ would always be applied to three 0s or 1s in a random data stream if the same channel is being utilized along with the same transmission length.

Figure 2:
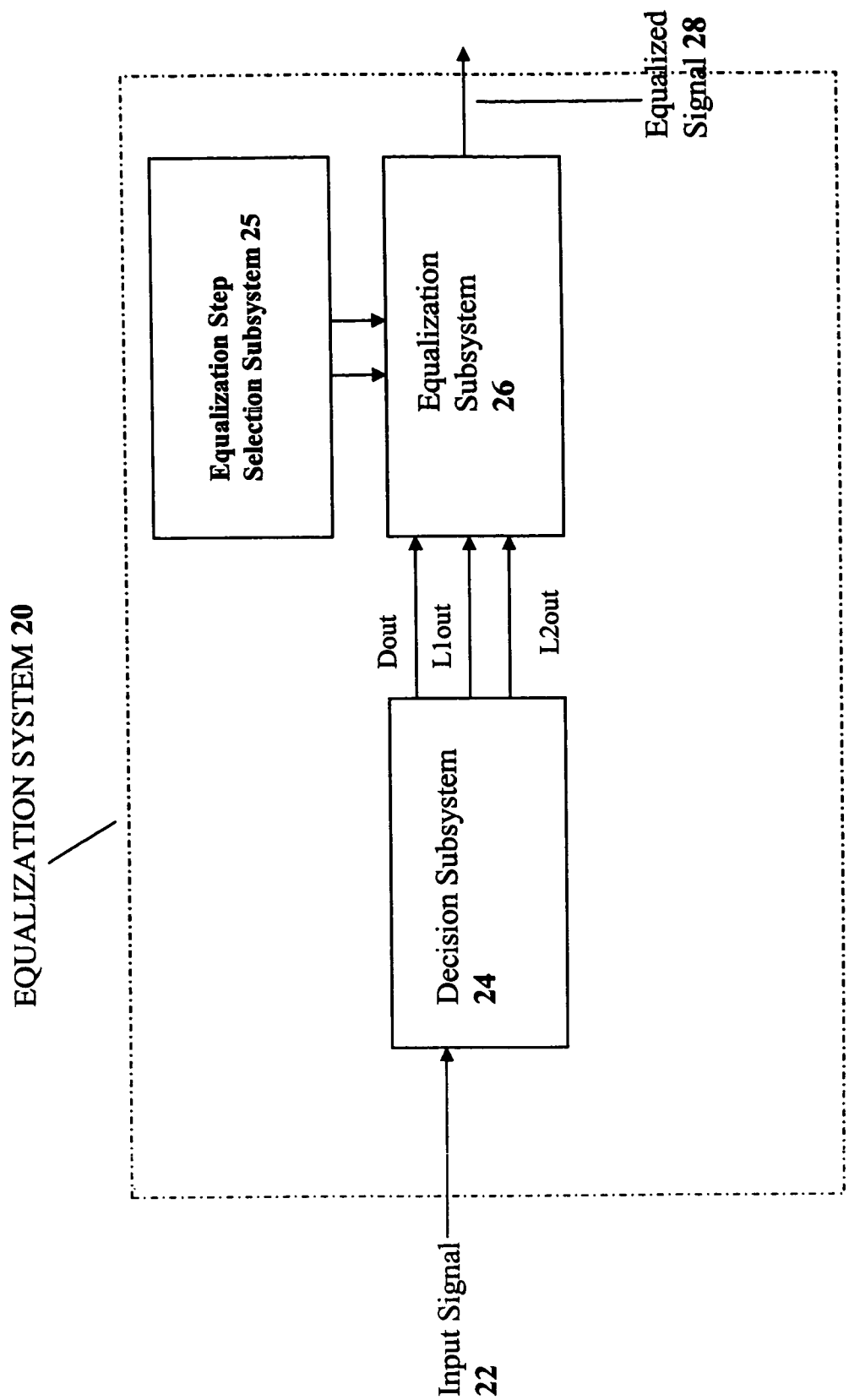
FIG. 2 illustrates a block diagram of an equalization system according to an embodiment of the present invention.

FIG. 2 illustrates a block diagram of a two-bit equalization system 20 according to an embodiment of the present invention. In an embodiment of the present invention, the equalization system 20 may receive an input signal 22, includes a decision subsystem 24 to decide when the input signal is adjusted and to produce a delayed input signal and at least two output signals to assist in adjusting the input signal, an equalization step selection subsystem 25 to select equalization step adjust sizes to adapt to transmit media variations, and an equalization subsystem 26 to receive the delayed input signal and the at least output signals from the decision subsystem 24, and to produce an equalized output signal 28 that is compensated for channel amplitude frequency response. In other embodiments of the invention, the decision subsystem 24 may produce three output signals (for a three-bit equalization), four output signals (for a four-bit equalization), and up to n output signals (for a n bit equalization).

In an embodiment of the present invention as illustrated in FIG. 2 (a two-bit equalization), the input signal 22 is sent to the decision subsystem 24, where the input signal 22 is analyzed to determine when adjustments may be made (see discussion with respect to FIG. 6 for details), and the decision subsystem 24 outputs three signals, (Dout, L1out, and L2out). Dout is the input signal delayed for three intervals to align the original data bit D1 with L1out and L2out. L1out is the output signal that indicates if and when a first adjustment is made. L2out is the output signal that indicates if and when a second adjustment is made. For example, if the input string contains two or more 0s in a string, L1out indicates that an adjustment is to be made at the interval where the second, third, etc. 0s occur (in this case a positive adjustment). If the input string contains three or more 1s, L2out indicates that an adjustment is to be made where the third, fourth, etc., 1s occur (in this case a negative adjustment). Note that L2out only indicates an adjustment needs to be made if L1out is also indicating that an adjustment needs to be made.

In one embodiment of the invention, a plurality of equalization step adjustment sizes are programmable. The equalization step adjustment sizes may be programmable because of the different media frequency response (due to different channel lengths and different channel materials). Alternatively, the equalization step adjustment sizes may be set by default. As illustrated in FIG. 2, the equalization step selection subsystem 25 selects equalization step adjustment sizes to adapt to transmit media variations.

The delayed input signal and the output signals from the decision subsystem 24, along with the equalization step adjustment sizes from the equalization step selection subsystem 25 are input into the equalization subsystem 26, which applies predetermined weights based on the equalization step adjustment sizes to the output signals of the decision subsystem 24 and combines the weighted output signals together. For example, if the input signal contains three 0s in a string, the equalization subsystem 26 correlates the predetermined amplitudes to Dout, L1out and L2out by applying the equalization step adjustment sizes to L1out and L2out. After the predetermined amplitudes are correlated to Dout, L1out, and L2out, Dout, L1out and L2out are combined to produce the equalized output signal 28.

Figure 3A:
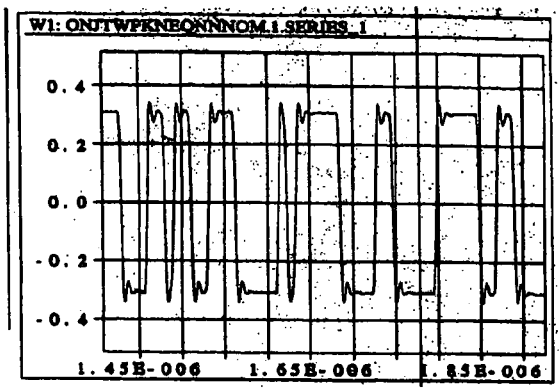
FIG. 3(a) illustrates simulation results of an input waveform with no equalization as in the prior art.
Figure 3B:
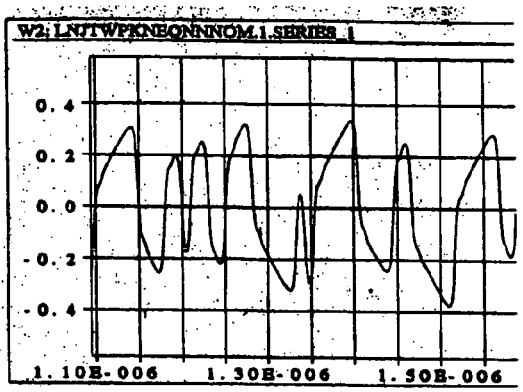
FIG. 3(b) illustrates simulation results of an output waveform with no equalization as in the prior art.
Figure 4A:
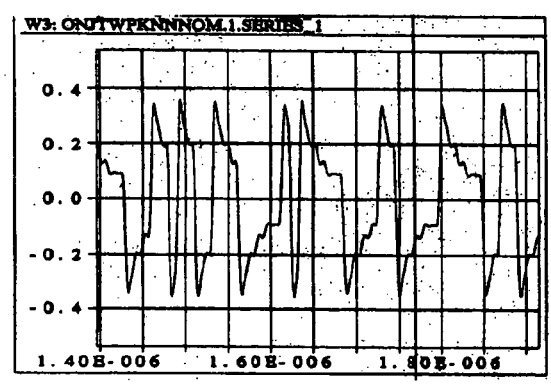
FIG. 4(a) illustrates simulation results of an input waveform with equalization according to an embodiment of the present invention.
Figure 4B:
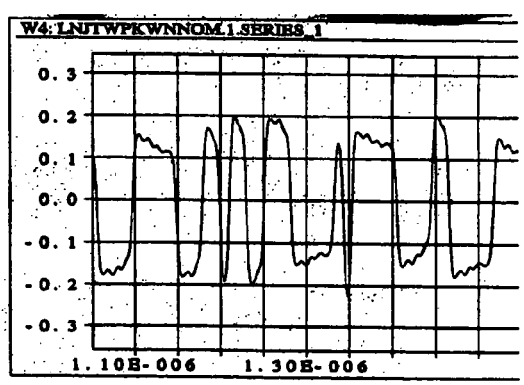
FIG. 4(b) illustrates simulation results of an output waveform with equalization according to an embodiment of the present invention.

FIG. 3(a) illustrates simulation results of an input waveform with no equalization as in the prior art. FIG. 3(b) illustrates simulation results of an output waveform with no equalization as in the prior art. FIG. 4(a) illustrates simulation results of an input waveform with equalization according to an embodiment of the present invention. FIG. 4(b) illustrates simulation results of an output waveform with equalization according to an embodiment of the present invention. Simulation results on the input and output waveforms of a 20-inch FR4 PC board trace without (FIGS. 3(a) and 3(b)) and with (FIGS. 4(a) and 4(b)) equalization are illustrated. Without equalization, the amplitude differences between the short pulse (corresponding to shorter strings of 0s and 1s) and the long pulse (longer strings of 1s and 0s) of the output waveform are significant, as illustrated by FIG. 3(b). In contrast, the amplitude differences between the short and long pulses in the equalized waveform are very close, as illustrated by FIG. 4(b), due to equalization.

Figure 5A:
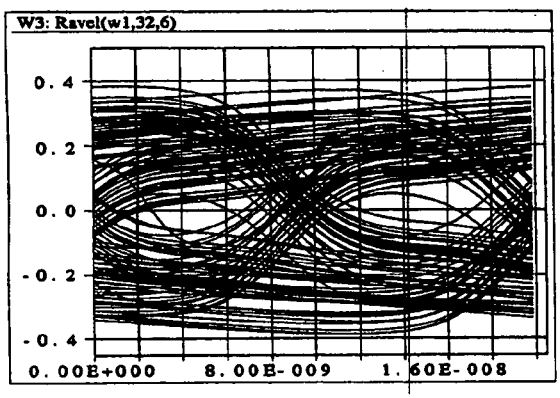
FIG. 5(a) illustrates an eye diagram of an output waveform with no equalization as in the prior art.
Figure 5B:
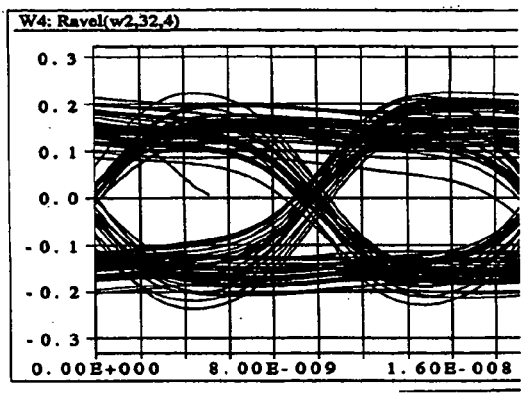
FIG. 5(b) illustrates an eye diagram of an output waveform with equalization according to an embodiment of the present invention.

FIG. 5(a) illustrates an eye diagram of an output waveform with no equalization according to the prior art. FIG. 5(b) illustrates an eye diagram of an output waveform with equalization according to an embodiment of the present invention. The eye opening for the equalized waveform (the right side) coming out of the PCB trace with frequency dependent loss is much greater than for the non-equalized waveform (the left side) and thus significantly reduces inter-symbol interference.

FIG. 6 illustrates a circuit implementation of the decision subsystem 24 according to an embodiment of the present invention. This example encompasses three equalization layers and is referred to as a three-bit equalization. Di represents the current data bit; $D_{i-1}$ represents the previous data bit before the current data bit; $D_{i-2}$ represents the data bit two intervals before the current data bit; and $D_{i-3}$ represents the previous data bit three intervals before the current data bit. The decision system outputs the three equalization step adjustment sizes, L1out, L2out, and L3out along with Dout. In this embodiment, Dout is equal to Di delayed for three intervals. Di is compared separately to $D_{i-1}$, $D_{i-2}$, and $D_{i-3}$ in XOR circuits 40 43 46 as illustrated in FIG. 6. The output from XOR 40 is input to an inverted exclusive or circuit (XNOR) 41 along with Di (delayed by an interval). The result, after a one-interval delay 42, is L1 out.

The comparison between Di and $D_{i-2}$ occurs in XOR 43. The output of XOR 43 is input to OR 44, along with the output of XOR 40. The output of OR 44 is input into XNOR 45 along with $D_i$ (delayed by two intervals). The output of XNOR 45 is labeled L2out.

The comparison between $D_i$ and $D_{i-3}$ occurs in XOR 46. The output of XOR 46 is input to OR 47 along with the output of XOR 43 and the output of XOR 40. The output of OR 47 is input into XNOR 48 along with $D_i$ (delayed by two intervals). The output of XNOR 48 is labeled L3out.

For example, if $D_i$ and $D_{i-1}$, have different values, e.g., "10" or "01", L1out will have the same sign as Dout. Accordingly, L2out and L3out also have the same sign as L1out. This example represents the highest signal amplitude because L1out, L2out and L3out have the same sign as Lout, and Dout will not need to be adjusted.

However, if $D_i$ and $D_{i-2}$, are the same, L1out has a sign (value) opposite of Dout. If $D_i$ and $D_{i-2}$ are different, then L2out has the same sign as $D_{out}$. Since L2out is the same sign as $D_{out}$, $D_{i-3}$ is ignored and L3out has the same sign as L2out. This outcome is the case if the input string is "110" or "001." In this case, only one adjustment is made at the second one and second zero, respectively.

If $D_i$ and $D_{i-1}$, are the same and $D_i$ and $D_{i-2}$ are the same, then L2out has a sign opposite of $D_{out}$ and an adjustment needs to be made. For example, L2out would be activated for input strings of "111" and "000" and an adjustment needs to be made. Then, the comparison result of $D_i$ and $D_{i-3}$ is used to determine the sign of L3out. Similarly, L3out is activated for input strings of "1111" and "0000."

FIG. 7 illustrates a logic table for an input string that has been transmitted through the decision subsystem of FIG. 6, according to an embodiment of the present invention. Note, the L1out, L2out and L3out values are unknown for the first row, a, since the bit string didn't have the information on the bit right before a bit.

Figure 8:
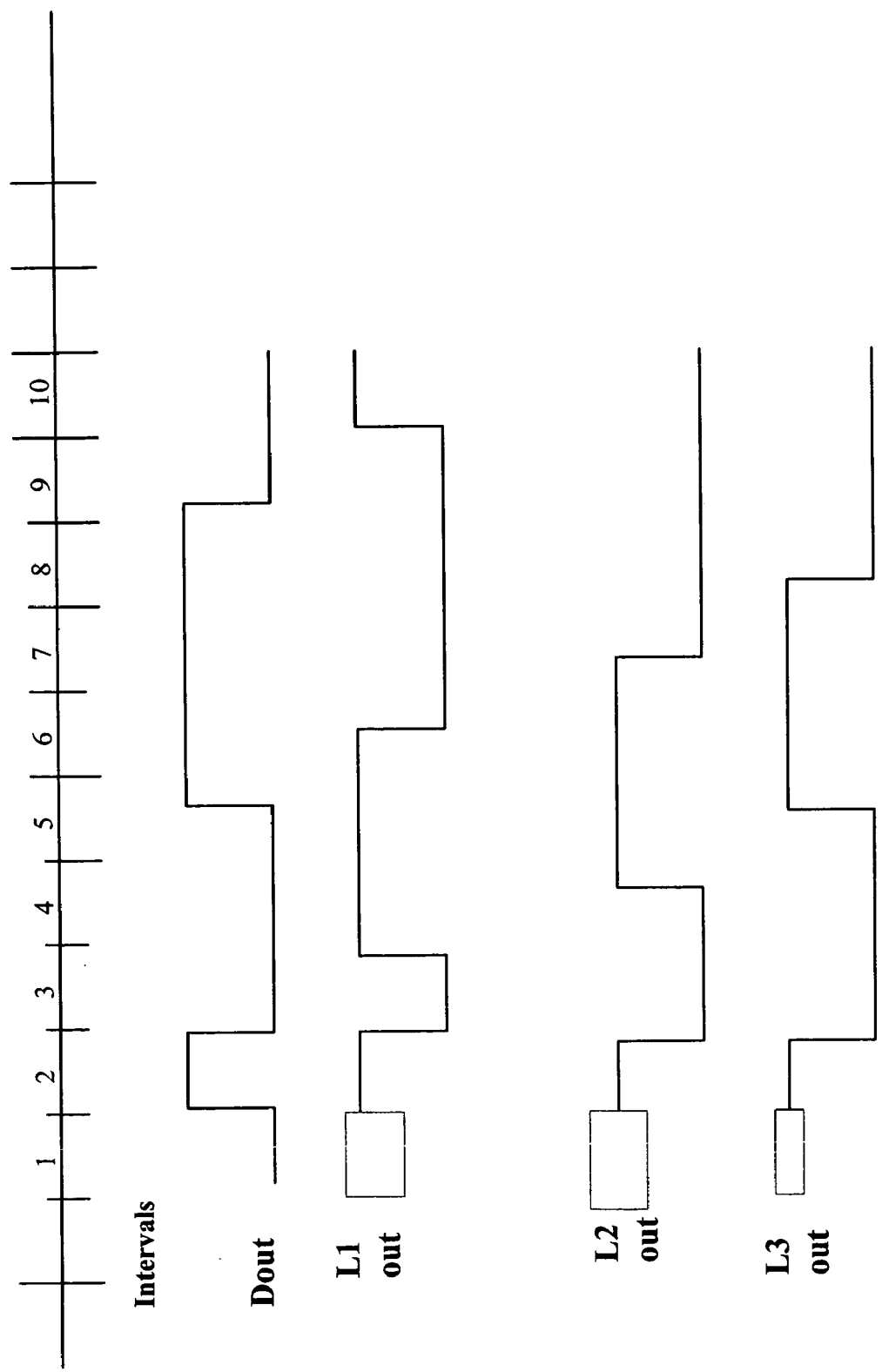
FIG. 8 illustrates a resulting waveform of the input string that was transmitted through the decision subsystem of FIG. 6 according to an embodiment of the present invention.

FIG. 8 illustrates a resulting waveform of the input string that was transmitted through the decision subsystem of FIG. 6 according to an embodiment of the present invention. Adjustments to the output signal by the equalization subsystem 26 are made when the value of Dout is different than any of L1out, L2out, or L3out. In this example, the sample input data stream is 0100011110011. In this stream the first three values are 010. No adjustment is made for second bit 1 and third bit 0, or L1out, L2out and L3out have the value as data bit. Because the string, 010, has the highest frequency, e.g., transitions occur at every interval. However, values d and e together with value c forms a string of three zeros. Referring to FIG. 7, value d has a Dout value of 0, an L1out value of 1, an L2out value of 0, and an L3out value of 0. Because the L1out value is different than the Dout value, an adjustment is made in the first interval after the transition. In this case, the adjustment will be an addition.

Figure 9:
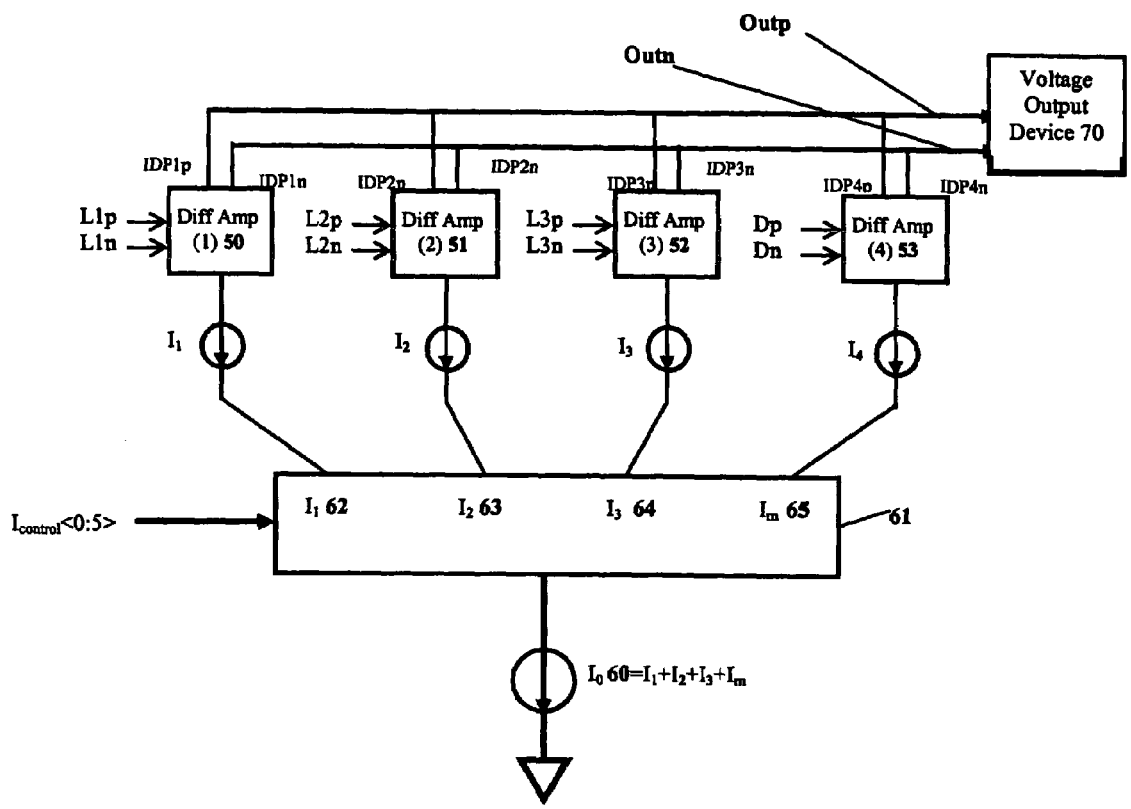
FIG. 9 illustrates an efficient circuit implementation of the equalization system according to an embodiment of the present invention.

FIG. 9 illustrates an equalization subsystem according to an embodiment of present invention. Outputs L1out, L2out, L3out and Dout are each converted from single-ended signals to differential mode signals. For example, L1out is converted to L1p and L1n; L2out is converted to L2p and L2n; L3out is converted to L3p and L3n; and Dout is converted to Dn and Dp. Illustratively, each input pair, e.g. L1p and L1n, can only be +1 (meaning L1p is higher than L1n in terms of voltage) or a −1 (meaning L1p is lower than L1n in terms of voltage).

The differential mode signals may be input into the differential amplifiers. Illustratively, L1p and L1n are input to Differential Amplifier 1 50; L2p and L2n are input to Differential Amplifier 2 51; L3p and L3n are input to Differential Amplifier 3 52; and Dp and Dn are input to Differential Amplifier 4 53. Differential Amplifier 53 is the main amplifier because it is used to amplifier the data bit, Dp and Dn, and carries the most current.

A tail current, $I_0$ 60, is partitioned by the current control bits in a control subsystem 61 into four branches, $I_1$ 62, $I_2$ 63, $I_3$ 64 and Im 64. The amount for each current branch is predetermined by the size or amplitude of each equalization step adjustment sizes. In one embodiment of the invention, the equalization step adjustment sizes are programmable. The equalization step adjustment sizes may be programmable because of the different media frequency response (due to different channel lengths and different channel materials) or may be set by default. In the embodiment of the invention illustrated in FIG. 8, the equalization step adjustment sizes may be determined by control bits of the control subsystem 61. In this embodiment, six control bits ($I_{control}$[0 ... 5]) may be used with each current $I_i$ being controlled by two control bits.

The current branches, $I_1$ 62, $I_2$ 63, $I_3$ 64 and $I_m$ 65 each are input to the differential pairs with $I_1$ 62 input to differential amplifier 1 50, $I_2$ 63 input to differential amplifier 2 51, $I_3$ 64 input to differential amplifier 3 52, and $I_m$ 65 input to differential amplifier 4 53. The differential amplifier may produce output currents IDP1p or IDP1n, IDP2p or IDP2n, IDP3p or IDP3n, and IDP4p or IDP4n.

Illustratively, if the value of the input signal is one, e.g., L1p is greater than L1n, then the current is steered to the p side of the differential amplifier, in this case differential amplifier 1 50, and the output current from the differential amplifiers 50 is added to the other differential amplifier current outputs. Conversely, if the value of the input signal to the differential amplifier is −1, meaning L1n is greater than L1p, then the output current of differential amplifier 1 50 is IDP1n, and IDP1n is subtracted from the other differential amplifier current outputs. The total output current (Outp−Outn) is equal to the combination of the currents are output from the differential amplifiers (IDP1p or IDP1n, IDP2p or IDP2n, IDP3p or IDP3n, and IDP4p or IDP4n). The total output current (Outp−Outn) is converted to the compensated/equalized signal voltage in the output device 70. The magnitude of the compensated signal voltage may be the total output current multiplied by the resistance, R, in the output device 70, e.g., $Voltage_{output}$=(R×(Outp−Outn)).

The total tail current is a fixed amount. The total tail current is partitioned into $I_1$, $I_2$, $I_3$, and $I_m$. Assume $w_1$, $w_2$, and $w_3$ are user desired equalization step adjustment sizes, by choosing $I1=w_1/2$, $I2=w_2/2$, and $I_3=w_3/2$, a step $w_i$ can be generated between the signal level $I^1_{total}=I_1+I_2+I_3+I_m$, when all L1out, L2out, L3out data bit are in the same direction, and $I^2_{total}=\Sigma_{j\neq i}I_j+I_m-I_1$ where i=1 ... 0.3 and j=1 ... 3 and j≠I, when Liout is in the different direction from the rest. Therefore, each branch current is used to either boost total signal level, when $I_i$ and $I_m$ are the same in sign, or generate the desired step size $w_i$, when $I_m$ and $I_i$ are differ in sign. And, at no time, is any branch current is thrown to power.

Illustratively, if all the input values of Dout, L1out, L2out, and L3out are 1s, then the current is directed to the p-side of the differential amplifier and all of the differential amplifier currents, IDP1p, IDP2p, IDP3p, and IDP4p are added together to generate the largest signal amplitude. This outcome corresponds to when an input string is in transition, illustratively, from 0 to 1.

If the input value of Dout is 1 and L1out is illustratively 0, then the current in differential pair 1 50 is directed to the n side and IDP1n is the output current. When the negative current is added to the other positive main differential amplifier current, a negative adjustment is made to the current. Consequentially the voltage step in this example, is equal to 2×R×$I_1$ because when the output voltage in the example above (output voltage is equal to R×[$I_m+I_1+I_2+_3$]) is compared to the output voltage in this example (R×[$I_m+I_2+I_3-I_1$]), and the result is 2×R×$I_1$. This outcome corresponds to when a string of two 1s appear in the input string and a subtraction is made to the input signal to compensate for the channel frequency amplitude response. Similarly, the second step size, when a string of three consecutive 1s is present, the second step size is 2×R×$I_2$.

Illustratively, if the input values of Dout, L1out, L2out and L3out are all zeros, then the currents will be directed to the n side of the differential pairs and the total current has most negative value with its magnitude equaling to_$I_m+I_2+I_3+I_1$, the largest possible current in either directions. This outcome correlates to when a transition has occurred in the input signal from a value of 1 to a value of 0. In another example, the input values of Dout and L3out are zero, and the input values of L1out and L2out are both one. Therefore, the output currents from differential pairs 3 52 and 4 53 are on the n side and negative, and the output current from differential pairs 1 50 and 2 51 is on the p side of the differential pairs and positive. Therefore, the output current, $-I_m-I_3+I_1+I_2$, is two steps (from differential pairs 1 50 and 2 51) above the lowest current value. This value correlates to a string of three 0s, where two positive adjustments are made to the input signal to compensate for the channel frequency response.

Figure 10:
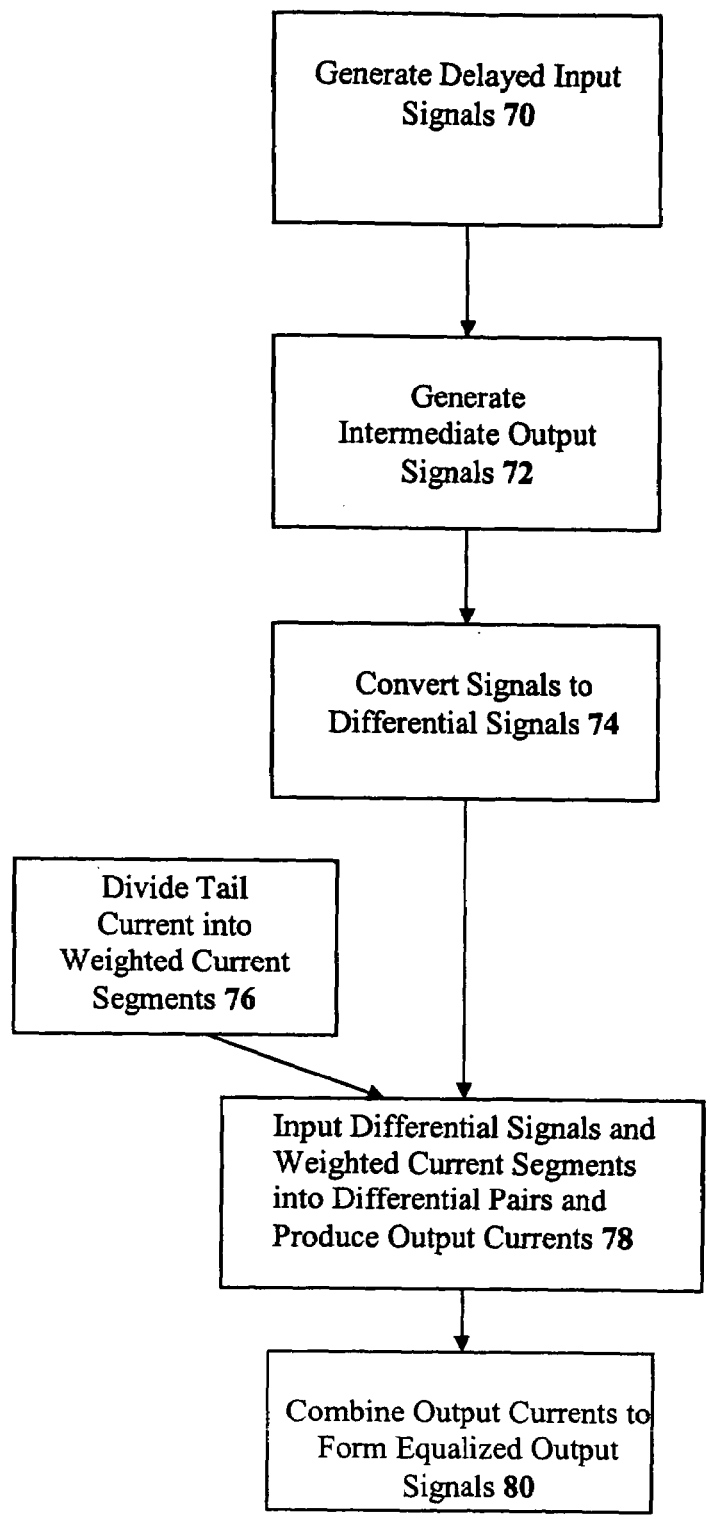
FIG. 10 illustrates a flow chart diagram of a transmit equalization method according to an embodiment of the present invention.

FIG. 10 illustrates a flow chart diagram of a transmit equalization method according to an embodiment of the present invention. A decision subsystem 24 latches 70 an input signal and then produces several delayed versions of input signal as needed. The decision subsystem 24 also generates 72 at least two intermediate output signals which contain equalization bits sign information to allow identify if and when adjustments need to be made to the input signal. The delayed input signal and the at least two intermediate output signals are converted 74 to a differential delayed input signal and at least two differential intermediate output signals. An equalization step selection subsystem 25 includes control bits to allow the selection of equalization step adjustment sizes instead of default step sizes, with the equalization step sizes based on channel frequency response. A tail current is divided 76 into, illustratively, three weighted current segments with a weight either default set or selected based on the equalization step adjustment size. The differential delayed input signal, the at least two differential intermediate output signals, and their corresponding weighted current segments are input 78 into at least three differential amplifier circuits, which produce three output currents. The three output currents are combined 80 to produce an equalized output signal.

The transmit equalization of the present invention this invention may be used successfully on any PCB material, other copper material, or fiber.

The present invention provides a method and system for at least two-bit transmit equalization in a high-speed serial data transmission system. The present invention pre-distorts the signal to compensate for the frequency dependent amplitude variation of the channel material. The pre-distortion is based on the consecutive number of 0 and 1 values in the signal data stream. The present invention enables a fast transmit equalization that is implemented with simple circuitry.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are intended to be embraced therein.

What is claimed is:

1. An at least two-bit equalization system, comprising:
   an equalization step selection subsystem to select equalization step adjustment sizes to adapt to transmit media variations in a channel where transmission occurs; and
   an equalization subsystem to receive a delayed input signal and at least two intermediate output signals, and also to receive the equalization step adjustment sizes from the equalization step selection subsystem, to apply the equalization step adjustment sizes to the at least two intermediate output signals to create at least two adjusted output signals, and to produce an equalized output signal from the delayed input signal and the at least two adjusted output signals.

2. The at least two-bit equalization system of claim 1, wherein the equalization step adjustment sizes are programmable.

3. The at least two-bit equalization system of claim 1, wherein the equalized output signal is in a parallel format.

4. A method for at least two-bit equalization of an input signal to compensate for a channel frequency response, comprising:
   selecting an equalization step size for each of at least two differential intermediate output signals based on the channel frequency response;
   dividing a tail current into at least three weighted current segments based on the equalization step sizes;
   inputting a differential delayed input signal, two differential intermediate output signals, and the at least three weighted current segments, into at least three differential amplifiers that output at least three output currents, the weighted current segments corresponding to the differential delayed input signal and the two differential intermediate output signals; and
   combining the at least three output currents to form an equalized output signal.

5. The method of claim 4, further including transmitting the equalized output signal via an interconnect.

6. The method of claim 4, wherein the equalization step size is programmable.

7. A system for transmitting equalized output data, comprising:
   a receiver to output data;
   an equalization system for receiving the data to be output, the equalization system including,
      an equalization step selection subsystem to select equalization step adjustment sizes to adapt to transmit media variations in a channel, and
      an equalization subsystem to receive a delayed input signal and at least two intermediate output signals based on the received data, and the equalization step adjustment sizes from the equalization step selection subsystem, to apply the equalization step adjustment sizes to the at least two intermediate output signals to create at least two adjusted output signals, and to produce the equalized output signal based on the delayed input signal and the at least two adjusted output signals, and
   a transmitter to transmit the equalized output signal utilizing an Ethernet protocol;
   an interconnect to receive the equalized output signal from the transmitter; and
   an Ethernet controller to receive the equalized output signal from the interconnect.

8. The system of claim 7, wherein the equalization step adjustment sizes are programmable.

9. The system of claim 7, wherein the interconnect is located on a backplane.

10. An apparatus for transmitting an equalized output signal on an Ethernet protocol interconnect, comprising:
    an equalization step selection subsystem to select equalization step adjustment sizes to adapt to transmit media variations in the Ethernet protocol interconnect, and
    an equalization subsystem to receive a delayed input signal and at least two intermediate output signals and the equalization step adjustment sizes from the equalization step selection subsystem, to apply the equalization step adjustment sizes to the at least two intermediate output signals to create at least two adjusted output signals, and to produce the equalized output signal compensated for the transmit media variations, and
    a transmitter to transmit the equalized output signal to the Ethernet protocol interconnect.

11. The apparatus of claim 10, wherein the equalization step adjustment sizes are programmable.

12. A transmitting device to transmit an equalized output signal to a channel, comprising:
    a decision subsystem to decide when an input signal is adjusted, and to produce a delayed input signal and at least two intermediate output signals to assist in adjusting the input signal;
    an equalization subsystem to receive the delayed input signal, the at least two intermediate output signals from the decision subsystem, to apply equalization adjustments to the at least two intermediate output signals to create at least two adjusted output signals, and to produce an equalized output signal compensated for the channel amplitude frequency response based on the delayed input signal and the at least two adjusted output signals; and
    a transmitter to send the equalized output signal to the channel.

13. The transmitting device according to claim 12, wherein n is a number of bits equalized in the equalization system and m is a number of output signals generated by the decision subsystem, n being greater than 2, and m being equal to n.

14. A system for transmitting equalized output data, comprising:
    a receiver to output data;
    an equalization system for receiving the data to be output, the equalization system including,
       a decision subsystem to decide when an input signal is adjusted, and to produce a delayed input signal and at least two intermediate output signals to assist in adjusting the input signal, and
       an equalization subsystem to receive the delayed input signal, the at least two intermediate output signals from the decision subsystem, to apply equalization adjustments to the at least two intermediate output signals to create at least two adjusted output signals, and to produce an equalized output signal compensated for the channel amplitude frequency response based on the delayed input signal and the at least two adjusted output signals;

a transmitter to transmit the equalized output signal utilizing an Ethernet protocol;

an interconnect to receive the equalized output signal from the transmitter; and an Ethernet controller to receive the equalized output signal from the interconnect.

15. The system according to claim 14, wherein the interconnect is a backplane.

16. The system according to claim 14, wherein the interconnect is a printed circuit board.

17. A method to transmit an equalized output signal to compensate for a frequency response of an interconnect, comprising:

inputting a differential delayed input signal, two differential intermediate output signals, and at least three weighted current segments into at least three differential amplifiers that output at least three output currents; and combining the at least three output currents to form an equalized output signal.

18. The method of claim 17, wherein a weight of the weighted current segments is set by a plurality of control bits in a control subsystem.

19. The method of claim 17, wherein the equalized output signal is transmitted to the interconnect utilizing the Ethernet protocol.

* * * * *